(12) United States Patent
Niimi

(10) Patent No.: US 8,288,977 B2
(45) Date of Patent: Oct. 16, 2012

(54) ROTATION ANGLE CALCULATION APPARATUS AND ROTATION ANGLE CALCULATION METHOD

(75) Inventor: Yoshitaka Niimi, Toyoto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 16 days.

(21) Appl. No.: 13/085,965

(22) Filed: Apr. 13, 2011

(65) Prior Publication Data

US 2012/0112672 A1    May 10, 2012

Related U.S. Application Data

(63) Continuation of application No. PCT/JP2010/069785, filed on Nov. 8, 2010.

(51) Int. Cl.
*H02P 6/16* (2006.01)
*H02P 3/08* (2006.01)

(52) U.S. Cl. .............. 318/400.04; 318/400.39; 318/461; 318/470

(58) Field of Classification Search ............... 318/139, 318/254, 400.01, 400.04, 400.39, 439, 461, 318/470, 807; 324/163
See application file for complete search history.

(56) References Cited

U.S. PATENT DOCUMENTS

| | | | | |
|---|---|---|---|---|
| 5,260,650 | A * | 11/1993 | Schwesig et al. | 324/163 |
| 5,565,752 | A * | 10/1996 | Jansen et al. | 318/807 |
| 5,585,709 | A * | 12/1996 | Jansen et al. | 318/807 |
| 6,826,499 | B2 * | 11/2004 | Colosky et al. | 702/85 |
| 7,235,941 | B2 * | 6/2007 | Park et al. | 318/400.01 |
| 7,463,968 | B2 * | 12/2008 | Snyder | 701/112 |
| 7,710,066 | B2 * | 5/2010 | Hashimoto et al. | 318/807 |
| 2003/0076060 | A1 * | 4/2003 | Colosky et al. | 318/254 |
| 2006/0138986 | A1 * | 6/2006 | Park et al. | 318/439 |
| 2008/0018296 | A1 * | 1/2008 | Hashimoto et al. | 318/807 |
| 2012/0082536 | A1 * | 4/2012 | Kawashima et al. | 414/694 |

FOREIGN PATENT DOCUMENTS

| | | |
|---|---|---|
| JP | B2 2541169 | 10/1996 |
| JP | A 9-056199 | 2/1997 |
| JP | A 2001-165707 | 6/2001 |
| JP | A 2004-061157 | 2/2004 |
| JP | A 2008-072820 | 3/2008 |
| JP | A 2009-248962 | 10/2009 |
| JP | A 2010-096708 | 4/2010 |

OTHER PUBLICATIONS

International Search Report issued in PCT/JP2010/069785, mailed Nov. 30, 2010. (with English-language translation).

* cited by examiner

*Primary Examiner* — Paul Ip
(74) *Attorney, Agent, or Firm* — Oliff & Berridge, PLC

(57) ABSTRACT

A control apparatus using a multipole resolver for calculating the rotation angle of a motor includes an acquisition unit, a learning unit, a calculation unit, and a correction unit. The acquisition unit acquires a detected angle $\theta$ detected by the multipole resolver. The learning unit learns the waveform of an error $Err\theta$ for each pole of the resolver. The calculation unit calculates a motor's rotational acceleration variation $\alpha$. The correction unit compares the rotation speed variation $\alpha$ with a threshold value $\alpha 0$. Where $\alpha < \alpha 0$, the correction unit performs a normal correction of calculating a corrected angle $\phi$ using an error $Err\theta$ of one mechanical period (in which the motor makes one full rotation) ago. In contrast, where $\alpha > \alpha 0$, the correction unit performs a transition correction of calculating a corrected angle $\phi$ using an immediately preceding error $Err\theta$.

12 Claims, 8 Drawing Sheets

ROTATION ANGLE CALCULATION APPARATUS AND ROTATION ANGLE CALCULATION METHOD

This is a Continuation of PCT Application No. PCT/JP2010/069785 filed Nov. 8, 2010. The entire contents of which are hereby incorporated by reference.

BACKGROUND OF THE INVENTION

1. Field of the Invention

The present invention relates to a technique of calculating the rotation angle of a motor by means of a multipole resolver.

2. Description of the Background Art

Conventionally, a technique of detecting or calculating, by means of a resolver, the rotation angle of a motor which is mounted on a hybrid vehicle, electric vehicle or the like has been known. The resolver is attached to the rotating shaft of the motor, and generates an electrical signal (analog signal) in accordance with the rotation angle of the motor, based on a change in magnetic flux. The electrical signal generated by the resolver is converted into an angular signal (digital signal) by a resolver-to-digital conversion circuit. While the torque of the motor is controlled based on the angular signal, it is known that this angular signal involves an error. With the purpose of improving accuracy in control of the motor, various techniques have therefore been proposed for correcting and thereby eliminating the error involved in the angular signal.

For example, Japanese Patent Laying-Open No. 2010-96708 (Patent Document 1) discloses a technique as follows. In the case where the rotation angle of a motor is to be calculated with a multipole resolver, one period taken for the motor to make one full rotation is equally divided into n sections in accordance with the number of poles (shaft angle multiplier) n of the resolver, it is determined in which of the n sections the angle detected by the resolver is included, and an error of the detected angle is individually corrected for each section. With this technique, even if respective detection errors generated in the n sections are different from each other, the errors are corrected individually section by section, and therefore, the correction of the errors can be made accurately.

SUMMARY OF THE INVENTION

If, however, the detected angle is corrected individually for each section (for each pole) like Patent Document 1, there is a relatively long time lag corresponding to one period in which the motor makes one full rotation, between the time when an error used for correction is learned and the time when the angle is detected. Therefore, in a transition period in which the operating state of the motor or inverter abruptly changes, the error may not be corrected as appropriate.

The present invention has been made to solve the problem as described above, and an object of the present invention is to appropriately suppress deterioration in accuracy of error correction, due to an abrupt change in operating state of a motor or inverter.

A rotation angle calculation apparatus according to the present invention calculates by means of a multipole resolver a rotation angle of a motor included in a drive apparatus having the motor and an inverter for controlling the motor. A mechanical period taken for the motor to make one full rotation includes the number, which is corresponding to the number of poles of the resolver, of resolver periods each taken for a detected angle of the resolver to complete one cycle. The rotation angle calculation apparatus includes: a calculation unit calculating an error of the detected angle of the resolver for each resolver period; and a correction unit calculating a corrected value of the detected angle detected by the resolver by correcting the detected angle using the error calculated before the detected angle is detected. The correction unit performs a transition correction in such a manner that a first extent to which a first error in a resolver period later than a resolver period of one mechanical period ago is reflected on the corrected value is larger when the drive apparatus is in a transition state than the first extent when the drive apparatus is not in the transition state.

Preferably, when the drive apparatus is not in the transition state, the correction unit performs a normal correction in such a manner that a second extent to which a second error in the resolver period of one mechanical period ago is reflected on the corrected value is larger than the first extent. The transition correction is a correction with the first extent larger than the second extent.

Preferably, the normal correction is a correction performed using the second error without using the first error. The transition correction is a correction performed using the first error without using the second error.

Preferably, the first error is the error in a resolver period immediately before a resolver period in which the detected angle is detected.

Preferably, when a variation per unit time of a rotation speed of the motor is larger than a predetermined variation, the correction unit performs the transition correction.

Preferably, the predetermined variation is set to a value at which a variation of the error due to a change in rotation speed of the motor exceeds a difference in the error between the resolver periods.

Preferably, when a variation per unit time of a torque of the motor is larger than a predetermined variation, the correction unit performs the transition correction.

Preferably, the predetermined variation is set to a value at which a variation of the error due to a change in magnetic field caused by a change in torque of the motor exceeds a difference in the error between the resolver periods.

Preferably, when a variation per unit time of a voltage of the inverter is larger than a predetermined variation, the correction unit performs the transition correction.

Preferably, the predetermined variation is set to a value at which a variation of the error due to a voltage change of the inverter exceeds a difference in the error between the resolver periods.

Preferably, the inverter includes a switching device controlled in accordance with a carrier frequency. The correction unit performs the transition correction when the carrier frequency changes.

A rotation angle calculation method according to another aspect of the present invention is a method for calculating by means of a multipole resolver a rotation angle of a motor included in a drive apparatus having the motor and an inverter for controlling the motor. A mechanical period taken for the motor to make one full rotation includes the number, which is corresponding to the number of poles of the resolver, of resolver periods each taken for a detected angle of the resolver to complete one cycle. The rotation angle calculation method includes the steps of: calculating an error of the detected angle of the resolver for each resolver period; and calculating a corrected value of the detected angle detected by the resolver by correcting the detected angle using the error calculated before the detected angle is detected. The step of calculating a corrected value includes the step of performing a transition correction in such a manner that an extent to which an error in a resolver period later than a resolver period of one mechanical period ago is reflected on the corrected value is larger when the drive apparatus is in a transition state.

In accordance with the present invention, in the case where an error of a multipole resolver is to be corrected, deterioration in accuracy of error correction due to an abrupt change in the operating state of a motor or inverter can appropriately be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
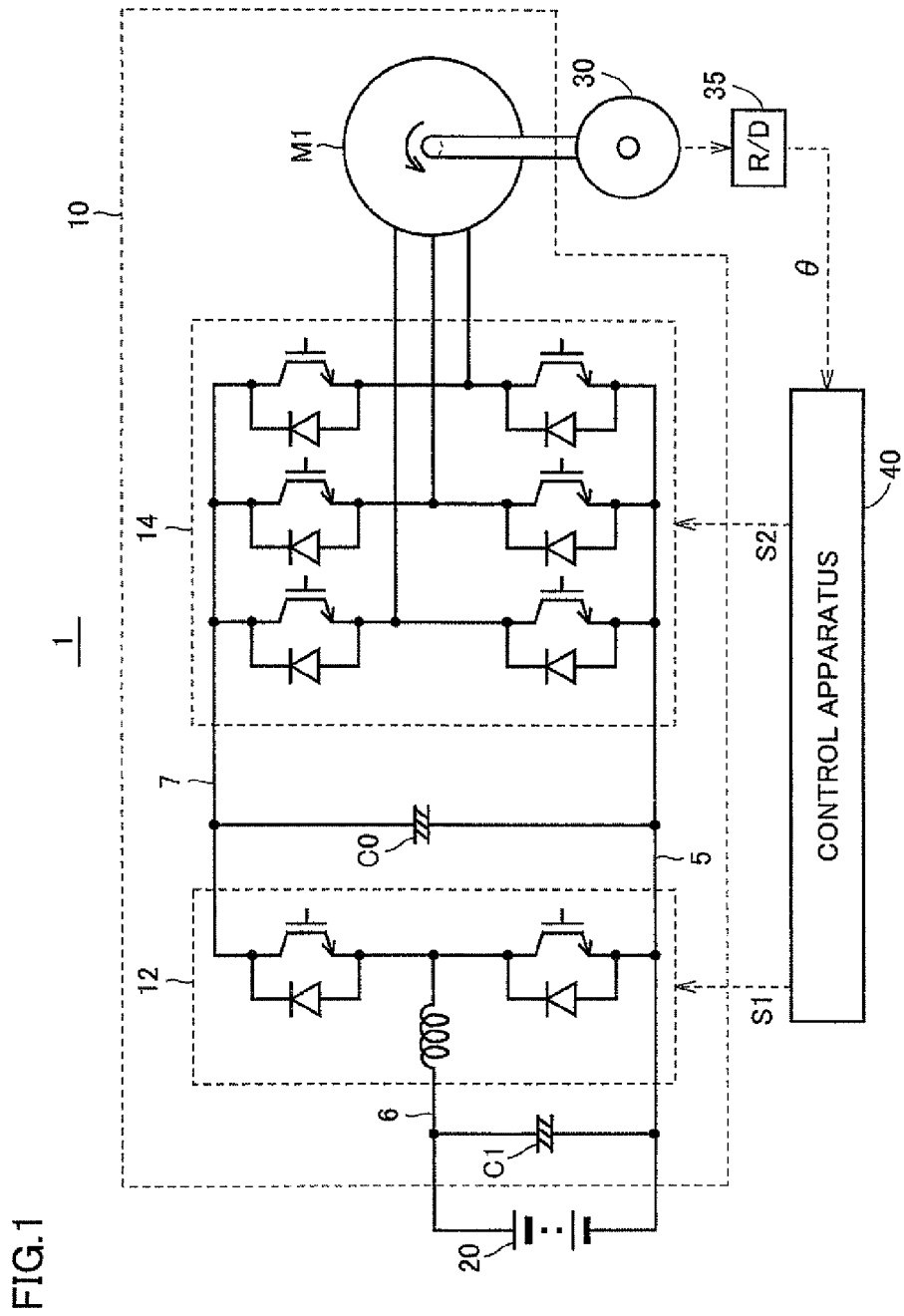
FIG. 1 is a diagram of an entire configuration of a motor drive control system 1 to which a rotation angle calculation apparatus is applied.

Embodiments of the present invention will hereinafter be described in detail with reference to the drawings. In the drawings, the same or corresponding components are denoted by the same reference characters, and a description thereof will not be repeated in principle.

FIG. 1 is a diagram of an entire configuration of a motor drive control system 1 to which a rotation angle calculation apparatus according to an embodiment of the present invention is applied.

Referring to FIG. 1, motor drive control system 1 includes a drive apparatus 10, a DC (direct current) power supply 20, a resolver 30, a resolver-to-digital conversion circuit (hereinafter referred to as "R/D circuit") 35, and a control apparatus 40.

Drive apparatus 10 includes a converter 12, an inverter 14, a motor M1, and smoothing capacitors C0, C1.

DC power supply 20 is typically formed of a secondary battery such as nickel-metal hydride battery or lithium ion battery, or a power storage device such as electrical double-layer capacitor.

Converter 12 includes a reactor, two switching devices, and two diodes. Converter 12 is controlled by a control signal S1 from control apparatus 40, and performs voltage conversion between DC power supply 20 and inverter 14 (motor M1).

Inverter 14 is constituted of respective upper arms and respective lower arms (switching devices) of three phases (U, V, W phases) provided in parallel between a positive line 7 and a negative line 5. Inverter 14 is controlled by a control signal S2 from control apparatus 40, and performs electric-power conversion between converter 12 (DC power supply 20) and motor M1.

Motor M1 is a traveling motor for generating a torque to drive the drive wheels of an electrically powered vehicle (referring here to vehicles generating a force for driving the vehicle from electrical energy, such as hybrid vehicle, electric vehicle, fuel cell vehicle, or the like), for example. This motor M1 may also be configured to have the function of an electric generator which is driven by the engine, or configured to have respective functions of the motor and the generator in combination. Further, motor M1 may be incorporated in a hybrid vehicle to operate as an electric motor for the engine so that it can start the engine for example.

Motor M1 is typically a three-phase permanent-magnet synchronous electric motor, and configured to have three coils of U, V, and W phases each having one end connected commonly to a neutral point. The other end of each phase coil is connected to an intermediate point between the upper arm and the lower arm of each phase in inverter 14.

Smoothing capacitor C0 is connected between a positive line 6 and negative line 5, and reduces an electric power variation component involved in positive line 6 and negative line 5. Smoothing capacitor C1 is connected between positive line 7 and negative line 5, and reduces an electric power variation component involved in positive line 7 and negative line 5.

Resolver 30 generates, based on a change in magnetic flux, an electrical signal (analog signal) in accordance with the rotation angle of motor M1, and outputs the electrical signal to R/D circuit 35. For the configuration itself of resolver 30, any well-known configuration may be used.

R/D circuit 35 converts the electrical signal from resolver 30 into an angular signal (digital signal), and outputs the angular signal to control apparatus 40. In the following, the angular signal which is output from R/D circuit 35 to control apparatus 40 will be referred to as "detected angle θ". In FIG. 1, R/D circuit 35 is shown to be provided separately from converter 12 and inverter 14. Instead, R/D circuit 35 may be provided in the same unit as converter 12 and inverter 14. Further, R/D circuit 35 may be provided inside control apparatus 40.

Resolver 30 is a multipole resolver. Where the number of poles (shaft angle multiplier) of resolver 30 is n (n is a natural number of 2 or more), the period taken for motor M1 to make one full rotation (hereinafter referred to as "mechanical period Tm" or simply "mechanical period") includes the same number as the number of poles n of the periods each taken for detected angle θ to changes by 360° (hereinafter referred to as "resolver period Tr" or simply "resolver period"). For the sake of easier understanding, the following description will be given chiefly for the case where the number of poles n of resolver 30 is "3".

Figure 2:
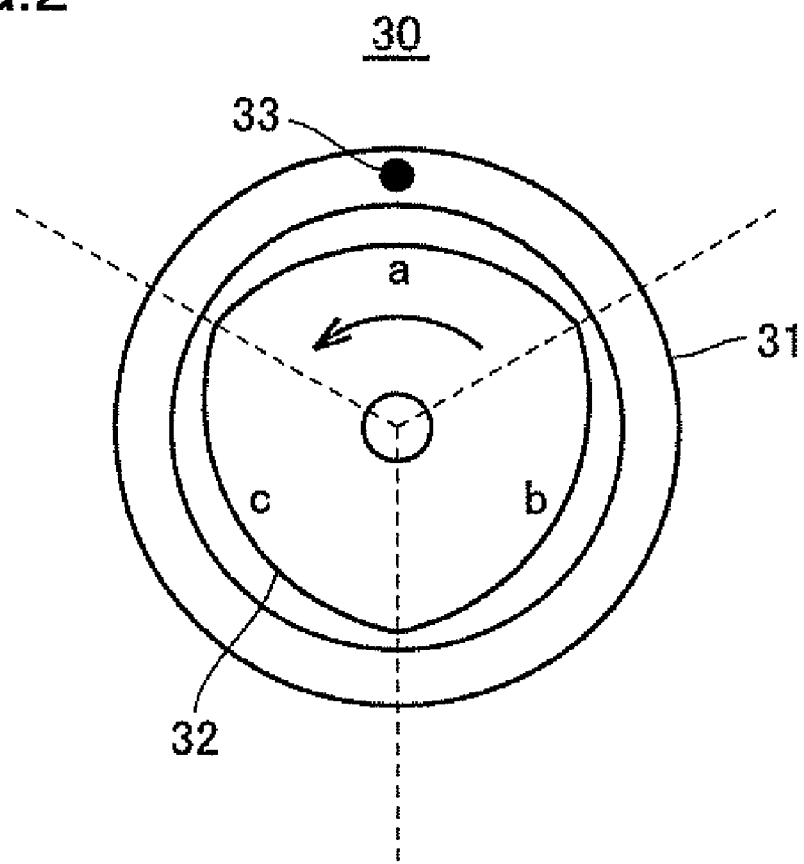
FIG. 2 is a diagram schematically showing a configuration of a three-pole resolver.

FIG. 2 is a diagram schematically showing a configuration of three-pole resolver 30. Resolver 30 includes an annular stator 31 and a rotor 32 having its center of rotation attached to the rotating shaft of motor M1. Rotor 32 is shaped in such a manner that the distance between the center of rotation and the outer rim periodically changes.

As shown in FIG. 2, it is supposed here that the regions into which rotor 32 is equally divided with respect to the center of rotation are defined as a, b, and c. Then, the pole which passes by a reference position 33 of stator 31 while rotor 32 is rotating in the direction indicated by the arrow in FIG. 2 periodically changes in the order of pole a, pole b, and pole c.

Figure 3:
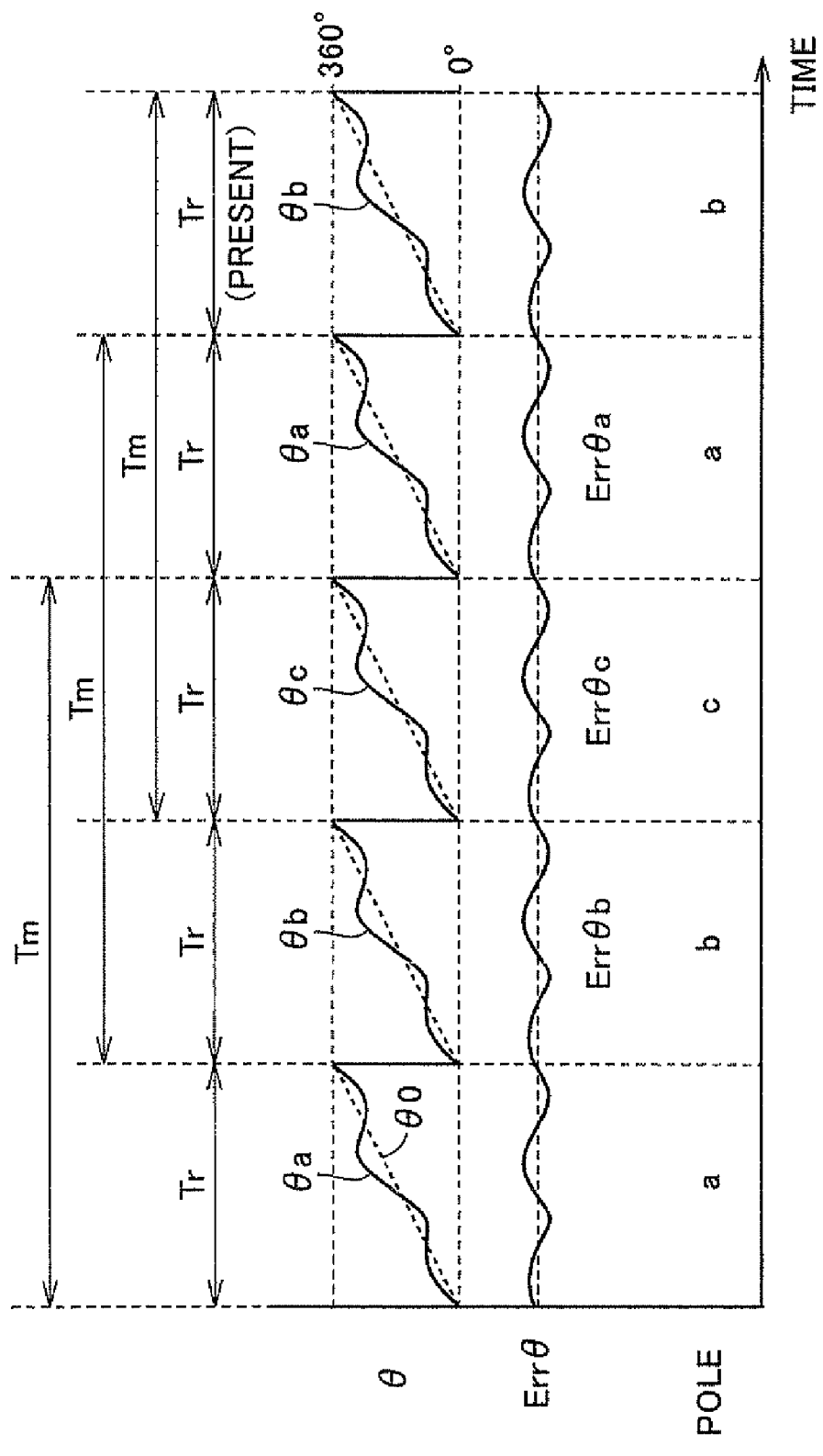
FIG. 3 is a diagram illustrating respective waveforms of a detected angle θ and an error Errθ of the three-phase resolver.

FIG. 3 illustrates respective waveforms of a detected angle θ and an error Errθ of three-pole resolver 30 shown in FIG. 2. In FIG. 3, a detected angle θa represents detected angle θ detected while pole a of rotor 32 passes by reference position 33 of stator 31. Likewise, detected angles θb, θc represent detected angles θ detected while poles b, c of rotor 32 pass by reference position 33 of stator 31, respectively. A description of "error Errθ" will be given later below.

As shown in FIG. 3, detected angles θa, θb, θc each change from 0° to 360°. The period taken for detected angle θ (detected angles θa, θb, θc) to change by 360° is resolver period Tr. In the case of the three-pole resolver, three resolver periods Tr are included in one mechanical period Tm as shown in FIG. 3.

It is noted that resolver 30 is provided with a sensor (not shown) that outputs to control apparatus 40 a reference signal once per resolver period (or per mechanical period), separately from detected angle θ. This reference signal is not influenced by a resolver error described later herein.

Referring back to FIG. 1, control apparatus 40 is configured of an electronic control unit (ECU) including therein a CPU (Central Processing Unit) and a memory (not shown), and controls operation of motor drive control system 1 based on a map and a program stored in the memory.

Control apparatus 40 uses detected angle θ detected by resolver 30 to control the output of motor M1. It is known, however, that detected angle θ includes an error component (hereinafter referred to as "resolver error") which is synchronized with rotation of motor M1.

In order to eliminate the influence of this resolver error, control apparatus 40 calculates and stores in advance the waveform of the resolver error of detected angle (hereinafter also referred to as "error Errθ") for each resolver period. Then, control apparatus 40 uses the stored error Errθ to make an error correction of correcting detected angle θ and thereby eliminate the influence of the resolver error from the detected angle θ. In the following, a value to which detected angle θ has been corrected using error Errθ will also be referred to as "corrected angle ϕ".

Figure 4:
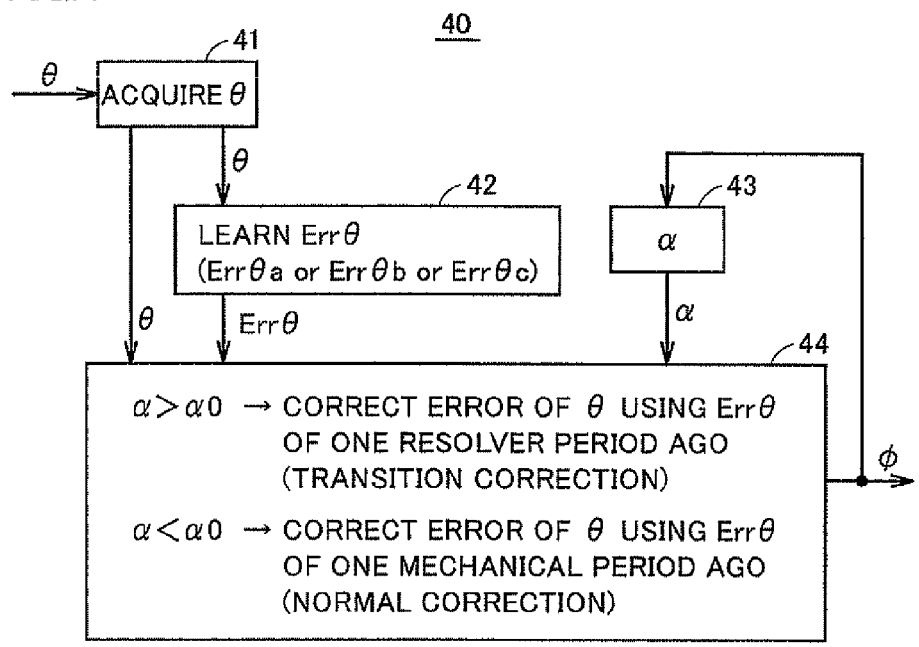
FIG. 4 is a functional block diagram of a control apparatus.

FIG. 4 is a functional block diagram of control apparatus 40 in performing an error correction. Each functional block shown in FIG. 4 may be implemented by hardware or implemented by software.

Control apparatus 40 includes an acquisition unit 41, a learning unit 42, a calculation unit 43, and a correction unit 44.

Acquisition unit 41 acquires detected angle θ detected by resolver 30, and outputs the detected angle to learning unit 42 and correction unit 44.

Learning unit 42 learns error Errθ. For example, learning unit 42 calculates, for each resolver period Tr (for each pole of resolver 30), a waveform of a difference between an ideal angle θ0 and an actually detected angle θ, as a waveform of error Errθ as shown in above-referenced FIG. 3, and stores the calculated waveform in a memory. Errθa (=θa−θ0) of pole a, error Errθb (=θb−θ0) of pole b, and error Errθc (=θc−θ0) of pole c are separately calculated and stored from each other. Here, ideal angle θ0 refers to an ideal value of the actual angle of rotor 32. Ideal angle θ0 may be calculated for example using the rotation speed and the rotational acceleration of rotor 32 calculated from the above-described reference signal. Alternatively, error Errθ may be learned in another manner.

Correction unit 44 performs an error connection using error Errθ learned by learning unit 42. This error correction eliminates the influence of the resolver error, so that the rotation angle of motor M1 can be calculated precisely.

As for the multipole resolver, due to the fact that the rotation angle of motor M1 have different phases for respective poles, respective waveforms of the resolver errors for respective poles tend to be different from each other. In consideration of the difference in error waveform between the poles, it is desirable for the error correction of the multipole resolver to make a correction using an error of the same pole as the pole when detected angle θ was detected, namely error Errθ which was learned one mechanical period ago.

It is known however that, in a transition state in which the operating state of drive apparatus 10 changes abruptly, the waveform of error Errθ also changes with the change of the operating state. For example, when the rotation speed of motor M1 changes, detected angle θ also changes due to the influence of frequency characteristics for example of R/D circuit 35, resulting in a change of error Errθ due to this influence.

In the case where a correction is made using error Errθ of the same pole as the pole when detected angle θ is detected, there is a time lag corresponding to one mechanical period (time lag longer than one resolver period) between the time when error Errθ was learned and the time when detected angle θ is detected. Therefore, if the state of drive apparatus 10 changes in this one mechanical period, the error waveform when it was learned and the actual error waveform when it is detected are considerably different from each other, resulting in a problem of deteriorated accuracy in correction of detected angle θ.

With the purpose of solving the problem as described above, control apparatus 40 of the present embodiment is provided with calculation unit 43 for calculating an index based on which whether or not drive apparatus 10 is in a transition state is determined (hereinafter referred to as "transition index"). Based on the transition index, correction unit 44 determines whether or not drive apparatus 10 is in a transition state and, following the result of determination, changes the way to correct detected angle θ.

In connection with the present embodiment, a case will be described by way of example where the transition index is defined as an amount of change per unit time of the rotation speed of motor M1 (namely the absolute value of the rotational acceleration of motor M1, hereinafter referred to as "rotation speed variation α"). Respective cases where the transition index is defined as other parameters will be described later herein in connection with first to third modifications.

Calculation unit 43 calculates the above-described rotation speed variation α as the transition index. Calculation unit 43 differentiates corrected angle ϕ twice that has been calculated by correction unit 44, and calculates the absolute value of the resultant derivative (=|d²ϕ/dt²|) to be used as rotation speed variation α.

Correction unit 44 compares rotation speed variation α with a threshold value α0. This threshold value α0 is set in advance to a value at which a change in error waveform due to a change in rotation speed of motor M1 exceeds a difference in error waveform between the poles. In other words, if rotation speed variation α exceeds threshold value α0, a change in error waveform due to the change in rotation speed exceeds a difference in error waveform between the poles.

Correction unit 44 calculates, when rotation speed variation α is smaller than threshold value α0 (drive apparatus 10 is not in a transition state but in a normal state), corrected angle ϕ using error Errθ of one mechanical period ago, in consideration of a difference in error waveform between the poles (such an error correction will hereinafter be referred to as "normal correction").

In contrast, when rotation speed variation α is larger than threshold value α0 (drive apparatus 10 is in a transition state), correction unit 44 calculates corrected angle φ using the latest error Errθ (error Errθ learned in the immediately preceding resolver period), in consideration of the fact that a change in error waveform resultant from the change of rotation speed is larger than the difference in error waveform between the poles (such an error correction will hereinafter be referred to as "transition correction").

In this way, correction unit 44 changes the way to correct an error, between the normal correction and the transition correction, depending on whether or not rotation speed variation α is larger than threshold value α0 (whether or not drive apparatus 10 is in a transition state).

Figure 5:
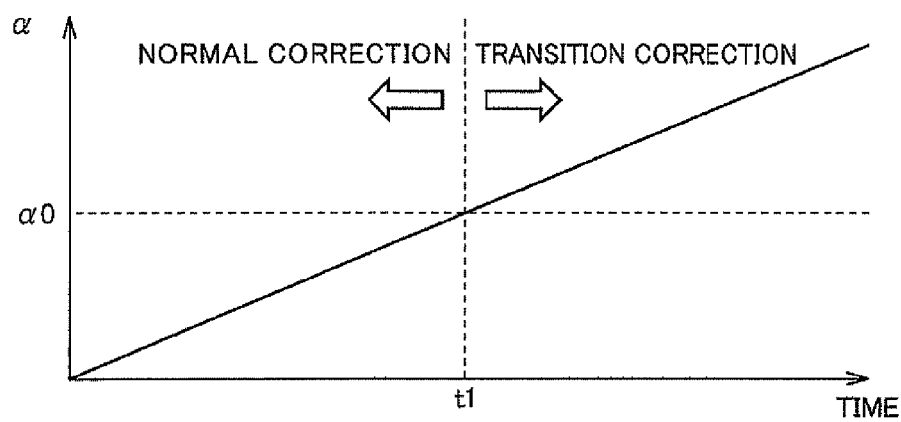
FIG. 5 is a diagram illustrating a correspondence between a rotation speed variation α and the way to correct an error.

FIG. 5 is a diagram illustrating a correspondence between rotation speed variation α and the way to correct an error. As shown in FIG. 5, when rotation speed variation α is smaller than threshold value α0 (in the period before time t1), the normal correction is performed. In contrast, when rotation speed variation α is larger than threshold value α0 (in the period after time t1), the transition correction is performed.

Figure 6:
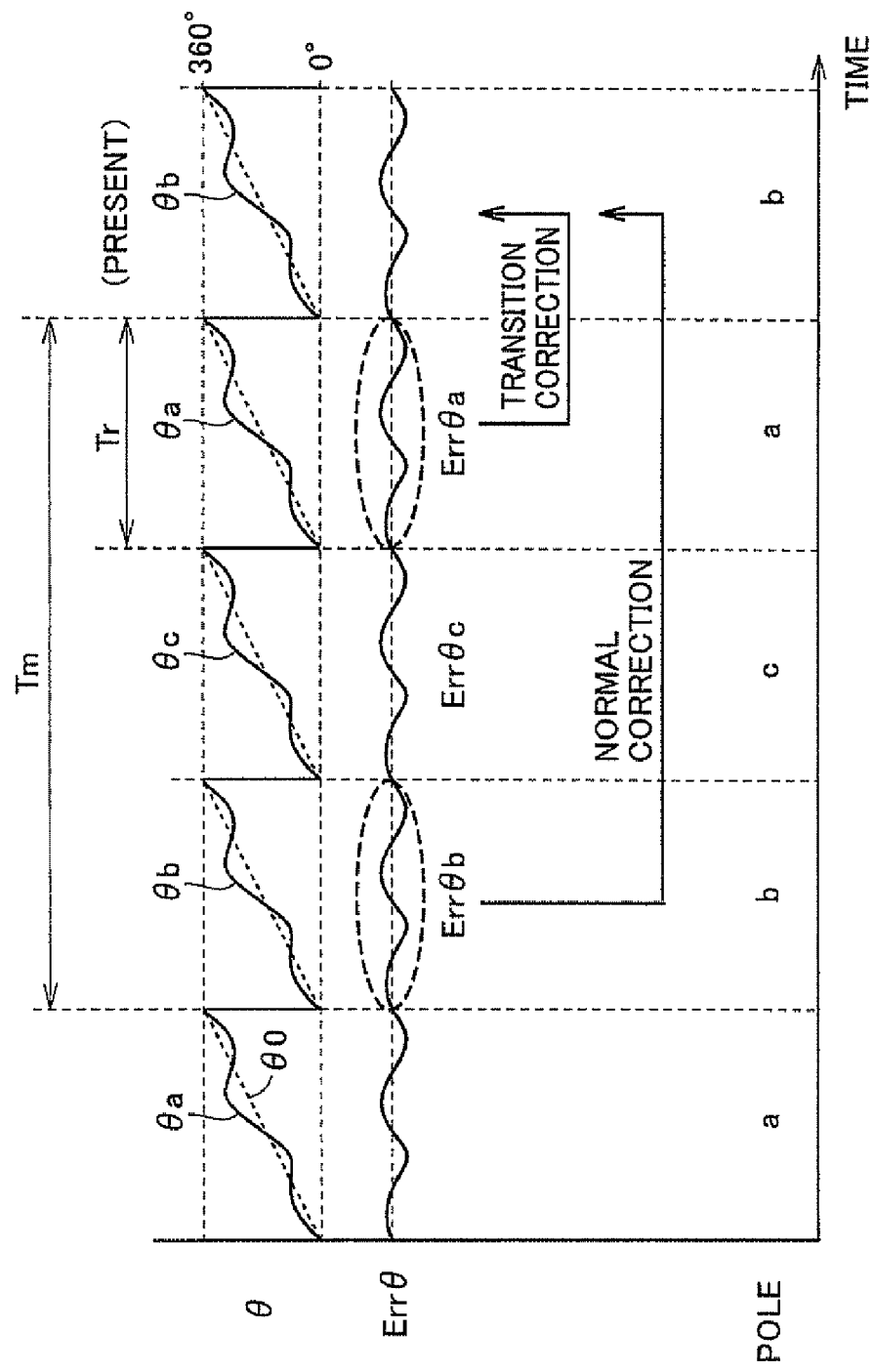
FIG. 6 is a diagram where an error Errθ used for a normal correction and an error Errθ used for a transition correction are compared with each other.

FIG. 6 is a diagram in which error Errθ used for the normal correction and error Errθ used for the transition correction are compared with each other. It is noted that FIG. 6 shows by way of example the case where detected angle θb of pole b is subjected to the present correction.

When the normal correction is performed, corrected angle φ is calculated using error Errθb of the same pole b of one mechanical period ago. In this way, as compared with the cases where errors Errθa, Errθb of other poles a, c are used, the influence of a difference in error waveform between the poles can appropriately be eliminated, so that the accuracy of corrected angle φ is improved.

In contrast, when the transition correction is performed, corrected angle φ is calculated using error Errθa of pole a of one resolver period ago. Thus, the time lag (corresponding to one resolver period) between the time when error Errθa is learned and the time when detected angle θb is detected can be shorter than the time lag (corresponding to one mechanical period) in the case of the normal correction, Therefore, the deterioration in accuracy of corrected angle φ, caused by a change of the error waveform resultant from a change in rotation speed can be minimized.

Figure 7:
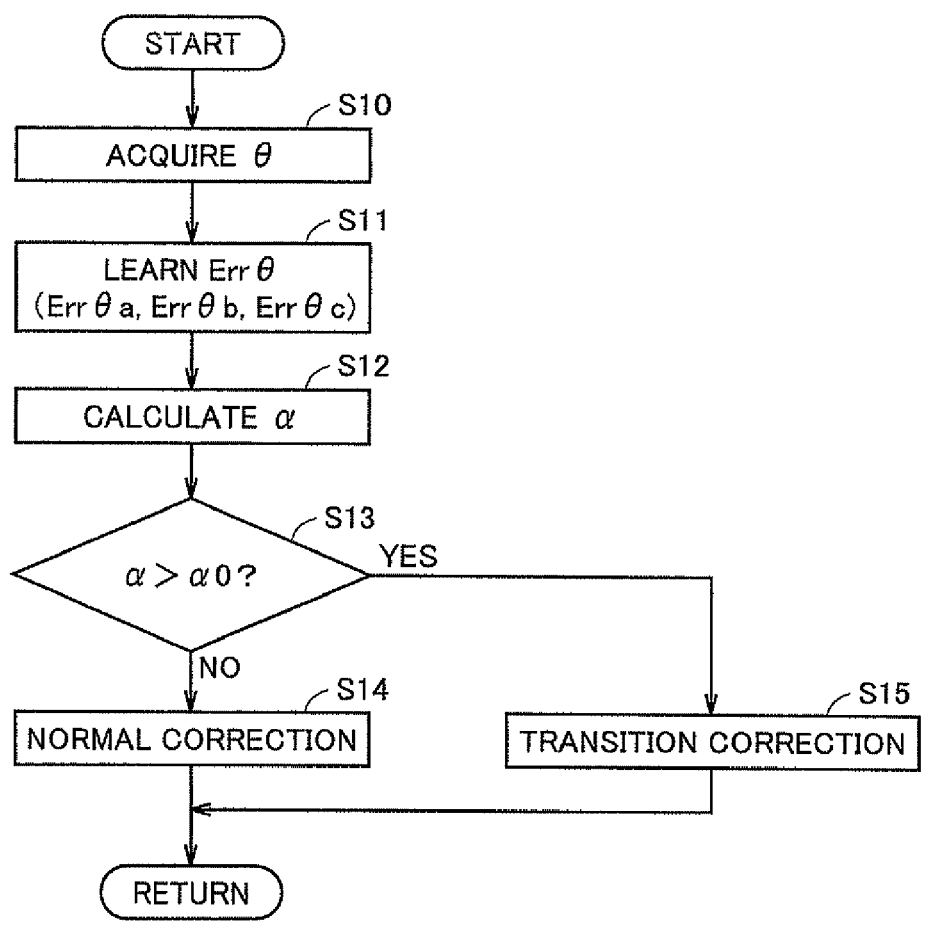
FIG. 7 is a flowchart showing a procedure followed by the control apparatus.

FIG. 7 is a flowchart showing a procedure followed by control apparatus 40 for implementing the above-described functions. Each step (hereinafter abbreviated as "S") of the following flowchart may be implemented by hardware or implemented by software as described above.

In S10, control apparatus 40 acquires detected angle θ detected by resolver 30, through R/D circuit 35.

In S11, control apparatus 40 learns error Errθ for each pole. Learned error Errθ is stored in a memory for use in a later error correction.

In S12, control apparatus 40 calculates rotation speed variation α. In S13, control apparatus 40 determines whether rotation speed variation α is larger than threshold value α0 or not.

Where α<α0 (NO in S13), control apparatus 40 proceeds to S14 and calculates corrected angle φ by the above-described normal correction.

Where α>α0 (YES in S13), control apparatus 40 proceeds to S15 and calculates corrected angle φ by the above-described transition correction.

As seen from the above, control apparatus 40 in the present embodiment determines, in correcting an error of detected angle θ of multipole resolver 30, whether or not drive apparatus 10 is in a transition state, based on the transition index (rotation speed variation), and changes the way to correct the error, between the normal correction and the transition correction, in accordance with the result of the determination. Thus, deterioration in error correction accuracy, due to an abrupt change in operating state of drive apparatus 10 (motor M1) can appropriately be suppressed. In other words, deterioration in correction accuracy due to a difference in error waveform between the poles and deterioration in correction accuracy due to an abrupt change in operating state (rotation speed) can be suppressed in a well-balanced manner. The accuracy in error correction of detected angle θ can thus be improved.

According to the foregoing description of the present embodiment, an error is corrected in a manner using one of the error waveforms (an error waveform of one mechanical period ago in the normal correction, and an error waveform of one resolver period ago in the transition correction). The manner of correcting an error, however, is not limited to this and may be modified to use a plurality of error waveforms. For example, an error may be corrected in various modified manners such as (i) using two error waveforms, namely an error waveform of one resolver period ago and an error waveform of further one resolver period, namely two resolver periods ago, (ii) using the average of a plurality of error waveforms, and (iii) using a plurality of weighted error waveforms.

The present invention is applicable to any of the correction manners. Specifically, when the present invention is applied to the manner of correction using a plurality of error waveforms, the transition correction may be done so that the extent to which an error learned after one mechanical period ago is reflected on corrected angle φ is larger than that in the normal correction. Alternatively, the normal correction may be done so that the extent to which an error learned one mechanical period ago is reflected on corrected angle φ is larger than the extent to which an error learned after one mechanical period ago is reflected on corrected angle φ, while the transition correction may be done in an opposite manner so that the extent to which an error learned after one mechanical period ago is reflected on corrected angle φ is larger than the extent to which an error learned one mechanical period ago is reflected on corrected angle φ.

If the number of poles is larger, it would possibly occur that an error of one resolver period ago cannot be reflected on corrected angle φ depending on the processing speed of control apparatus 40. In such a case, only an error that can be referenced may be taken into account.

First Modification

In the above-described first embodiment, rotation speed variation α is used as the transition index. Instead of rotation speed variation α, a variation per unit time of the torque of motor M1 (hereinafter referred to as "torque variation β") may be used.

Figure 8:
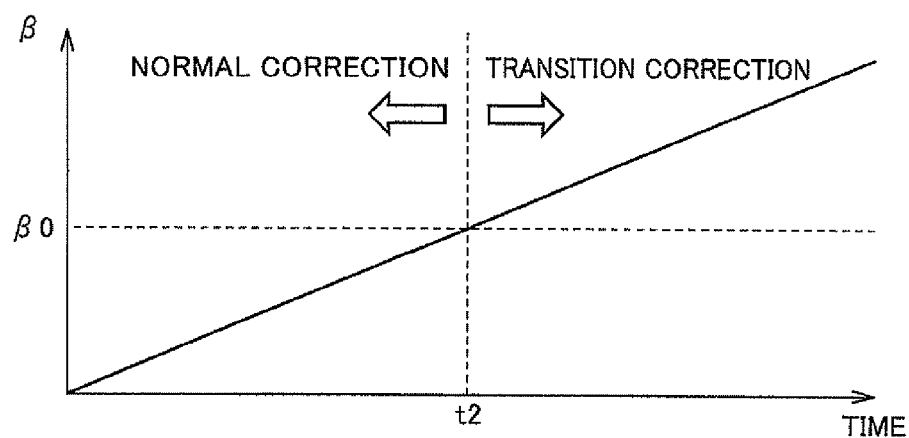
FIG. 8 is a diagram illustrating a correspondence between a torque variation β and the way to correct an error.

FIG. 8 is a diagram illustrating a correspondence between torque variation β and the way to correct an error, Where torque variation β is large, a variation in electric current flowing in motor M1 is also large, resulting in a large variation in leakage magnetic flux of motor M1. Since resolver 30 generates an electrical signal in accordance with the rotation angle of motor M1 based on a change in magnetic flux as described above, detected angle θ is influenced by magnetic noise such as leakage magnetic flux of motor M1. Therefore, if torque variation β is large, a variation of error Errθ is also large due to the influence of the large torque variation.

In view of the above, as shown in FIG. 5, the normal correction may be performed in the case where torque variation β is smaller than a threshold value β0 (in the period before time t2), and the transition correction may be performed in the case where torque variation β is larger than threshold value β0 (in the period after time t2). It is noted that threshold value β0 may be set in advance to a value at which a change in leakage magnetic flux (change in magnetic field) of motor M1 caused by a torque change of motor M1 is larger than a difference in error waveform between the poles.

Accordingly, deterioration in correction accuracy due to a difference in error waveform between the poles and deterioration in correction accuracy due to an abrupt change in magnetic field can be suppressed in a well-balanced manner. The accuracy in error correction of detected angle θ can thus be improved.

Second Modification

While the transition index in the above-described first embodiment is rotational speed variation α, variation per unit time of a voltage that is input from converter 12 to inverter 14 (hereinafter referred to as "voltage variation γ") may be used instead of rotation speed variation α.

Figure 9:
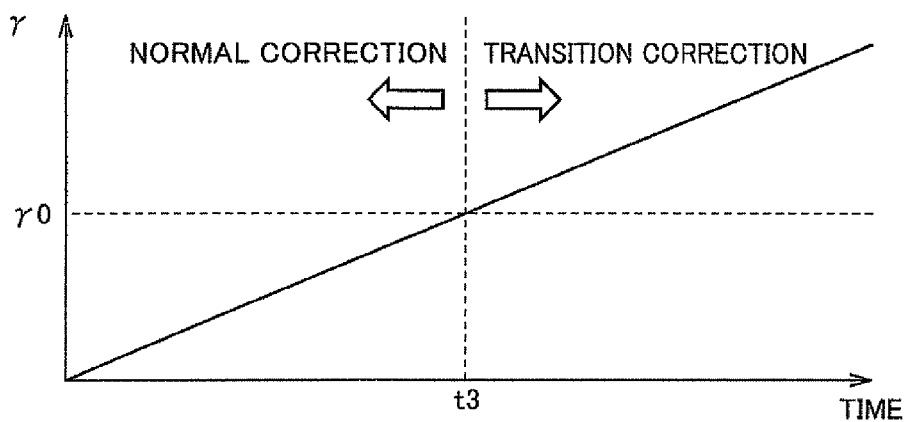
FIG. 9 is a diagram illustrating a correspondence between a voltage variation γ and the way to correct an error.

FIG. 9 is a diagram illustrating a correspondence between voltage variation γ and the way to correct an error. Where voltage variation γ is large, a change in switching period of converter 12 is also large, resulting in a large change in electrical noise such as switching surge.

As described above, resolver 30 generates an electrical signal in accordance with the rotation angle of motor M1 and communicates the electrical signal with R/D circuit 35. Detected angle θ is therefore influenced by electrical noise such as switching surge.

Therefore, if voltage variation γ is large, a variation in error Errθ is also large due to the influence of the large voltage variation.

In view of the above, as shown in FIG. 9, the normal correction may be performed when voltage variation γ is smaller than a threshold value γ0 (in the period before time t3), and the transition correction may be performed when voltage variation γ is larger than threshold value γ0 (in the period after time t3). It is noted that threshold value γ0 may be set in advance to a value at which a change in error waveform due to a voltage change exceeds a difference in error waveform between the poles.

In this way, deterioration in correction accuracy due to a difference in error waveform between the poles and deterioration in correction accuracy due to an abrupt change in voltage can be suppressed in a well-balanced manner. Accordingly, the accuracy in error correction of detected angle θ can be improved.

Third Modification

In the above-described first embodiment, rotation speed variation α is used as the transition index. Instead of rotation speed variation α, a carrier frequency f used for controlling switching of inverter 14 may be used.

Here, carrier frequency f will be described. Control apparatus 40 controls inverter 14 by means of pulse width modulation (hereinafter also referred to as "PWM") control. Under this PWM control, the switching devices of inverter 14 are turned on or off based on a voltage comparison between a carrier signal and a voltage command, to thereby apply a pulse width modulated voltage from inverter 14 to motor M1. Therefore, the switching period of inverter 14 depends on the frequency of the carrier signal. This frequency of the carrier signal is "carrier frequency f". Control apparatus 40 changes carrier frequency f depending on the state of drive apparatus 10 or the like.

Figure 10:
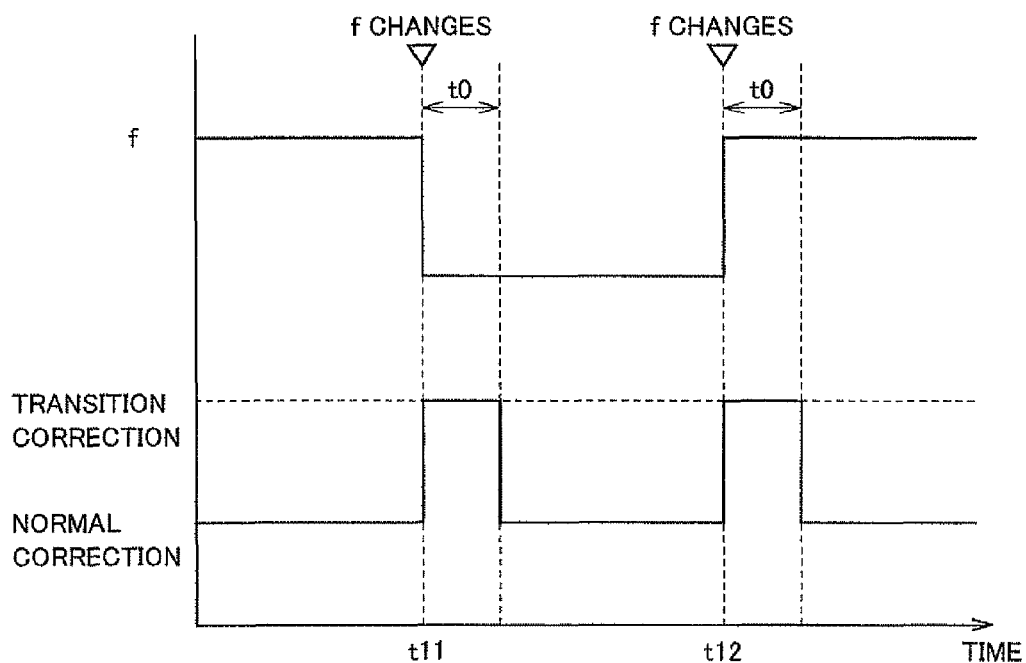
FIG. 10 is a diagram illustrating a correspondence between a carrier frequency f and the way to correct an error.

FIG. 10 is a diagram illustrating a correspondence between carrier frequency f and the way to correct an error. In the case where carrier frequency f changes, the switching period of inverter 14 changes as described above, resulting in a change in switching noise environment of inverter 14. Therefore, if carrier frequency f changes, error Errθ may also change due to the influence of electrical noise.

In view of this, as shown in FIG. 10, the transition correction may be performed in each predetermined period t0 from time t11, t12 at which carrier frequency f changes, and the normal correction may be performed in the remaining periods. It is noted that predetermined period t0 may for example be one mechanical period Tm.

In this way, deterioration in correction accuracy due to a difference in error waveform between the poles and deterioration in correction accuracy due to a change of the carrier frequency can be suppressed in a well-balanced manner. The accuracy in correction of an error of detected angle e can thus be improved.

It is noted that at least two of the ways to switch the correction manner used respectively in the first embodiment and the first to third modifications may appropriately be combined.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A rotation angle calculation apparatus calculating by means of a multipole resolver a rotation angle of a motor included in a drive apparatus having said motor and an inverter for controlling said motor,
   a mechanical period taken for said motor to make one full rotation including the number, which is corresponding to the number of poles of said resolver, of resolver periods each taken for a detected angle of said resolver to complete one cycle,
   said rotation angle calculation apparatus comprising:
   a calculation unit calculating an error of the detected angle of said resolver for each said resolver period; and
   a correction unit calculating a corrected value of said detected angle detected by said resolver by correcting said detected angle using said error calculated before said detected angle is detected, and
   said correction unit performing a transition correction in such a manner that a first extent to which a first error in a resolver period later than a resolver period of one mechanical period ago is reflected on said corrected value is larger when said drive apparatus is in a transition state than the first extent when said drive apparatus is not in the transition state.

2. The rotation angle calculation apparatus according to claim 1, wherein
   when said drive apparatus is not in said transition state, said correction unit performs a normal correction in such a manner that a second extent to which a second error in the resolver period of one mechanical period ago is reflected on said corrected value is larger than said first extent, and
   said transition correction is a correction with said first extent larger than said second extent.

3. The rotation angle calculation apparatus according to claim 2,
    said normal correction is a correction performed using said second error without using said first error, and
    said transition correction is a correction performed using said first error without using said second error.

4. The rotation angle calculation apparatus according to claim 3, wherein
    said first error is said error in a resolver period immediately before a resolver period in which said detected angle is detected.

5. The rotation angle calculation apparatus according to claim 1, wherein
    when a variation per unit time of a rotation speed of said motor is larger than a predetermined variation, said correction unit performs said transition correction.

6. The rotation angle calculation apparatus according to claim 5, wherein
    said predetermined variation is set to a value at which a variation of said error due to a change in rotation speed of said motor exceeds a difference in said error between said resolver periods.

7. The rotation angle calculation apparatus according to claim 1, wherein
    when a variation per unit time of a torque of said motor is larger than a predetermined variation, said correction unit performs said transition correction.

8. The rotation angle calculation apparatus according to claim 7, wherein
    said predetermined variation is set to a value at which a variation of said error due to a change in magnetic field caused by a change in torque of said motor exceeds a difference in said error between said resolver periods.

9. The rotation angle calculation apparatus according to claim 1, wherein
    when a variation per unit time of a voltage of said inverter is larger than a predetermined variation, said correction unit performs said transition correction.

10. The rotation angle calculation apparatus according to claim 9, wherein
    said predetermined variation is set to a value at which a variation of said error due to a voltage change of said inverter exceeds a difference in said error between said resolver periods.

11. The rotation angle calculation apparatus according to claim 1, wherein
    said inverter includes a switching device controlled in accordance with a carrier frequency, and
    said correction unit performs said transition correction when said carrier frequency changes.

12. A rotation angle calculation method for calculating by means of a multipole resolver a rotation angle of a motor included in a drive apparatus having said motor and an inverter for controlling said motor,
    a mechanical period taken for said motor to make one full rotation including the number, which is corresponding to the number of poles of said resolver, of resolver periods each taken for a detected angle of said resolver to complete one cycle,
    said rotation angle calculation method comprising the steps of:
    calculating an error of the detected angle of said resolver for each said resolver period; and
    calculating a corrected value of said detected angle detected by said resolver by correcting said detected angle using said error calculated before said detected angle is detected,
    said step of calculating a corrected value including the step of performing a transition correction in such a manner that an extent to which an error in a resolver period later than a resolver period of one said mechanical period ago is reflected on said corrected value is larger when said drive apparatus is in a transition state than the first extent when said drive apparatus is not in the transition state.

* * * * *